Figure 1:
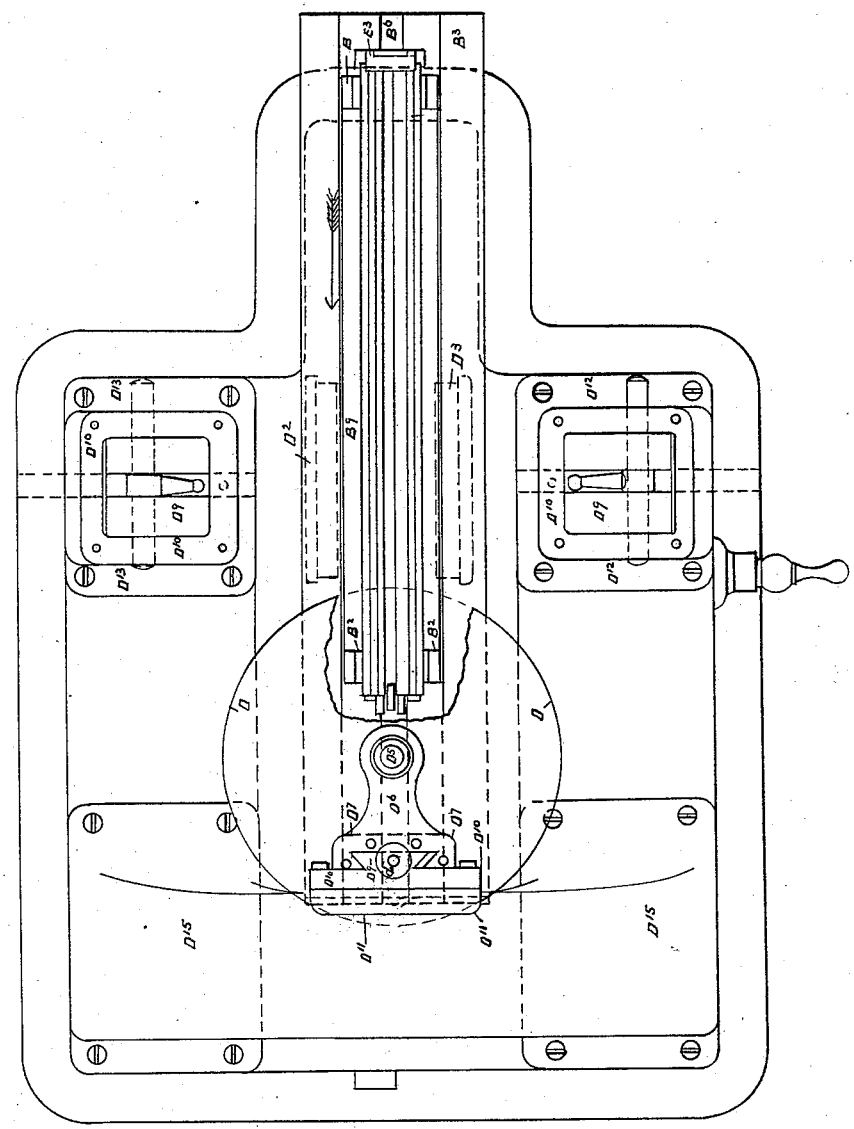

(No Model.) 3 Sheets—Sheet 1.

A. WEBSTER.
MACHINE FOR GRINDING LATHE BEDS.

No. 417,615. Patented Dec. 17, 1889.

WITNESSES
Geo. C. Bush
Henry F. McKeever

INVENTOR
Ambrose Webster
by his Attorneys
Brown Bros.

(No Model.)
A. WEBSTER.
MACHINE FOR GRINDING LATHE BEDS.
No. 417,615. Patented Dec. 17, 1889.
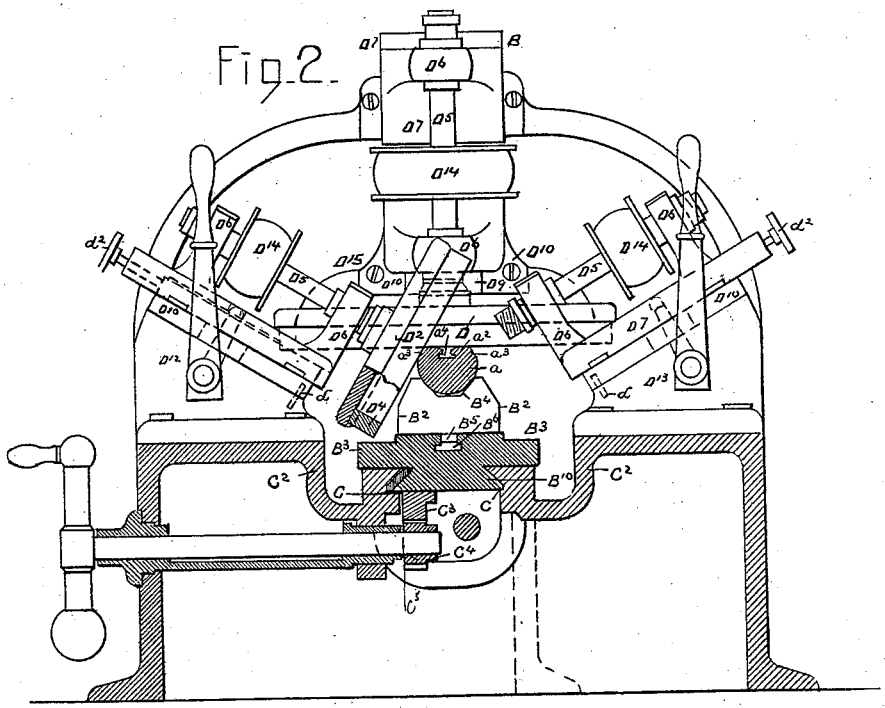
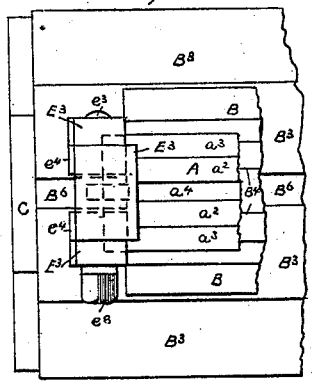
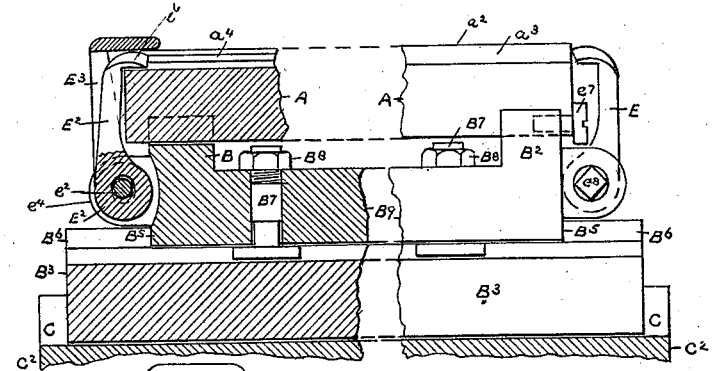
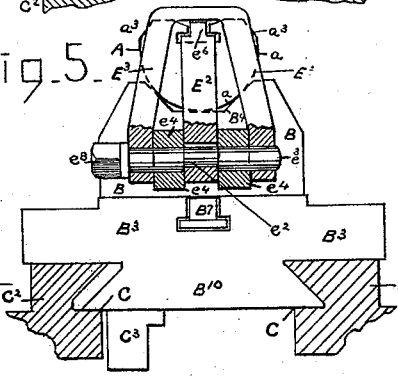
WITNESSES-
INVENTOR-
Ambrose Webster
by his Attorneys
Brown Bros.

(No Model.) 3 Sheets—Sheet 3.
A. WEBSTER.
MACHINE FOR GRINDING LATHE BEDS.
No. 417,615. Patented Dec. 17, 1889.
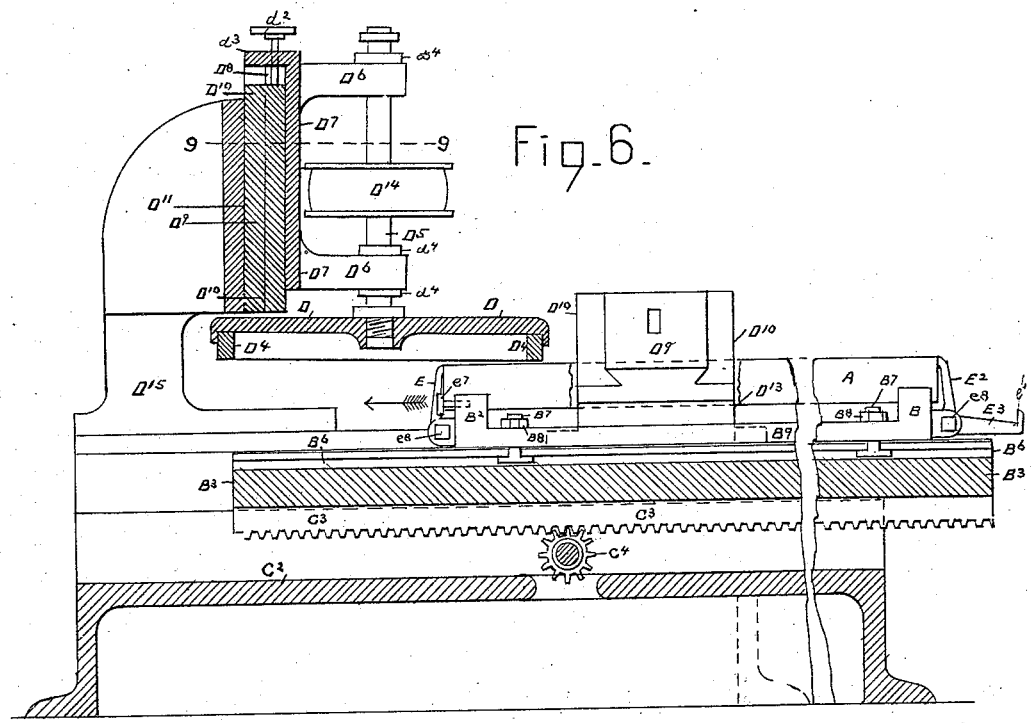
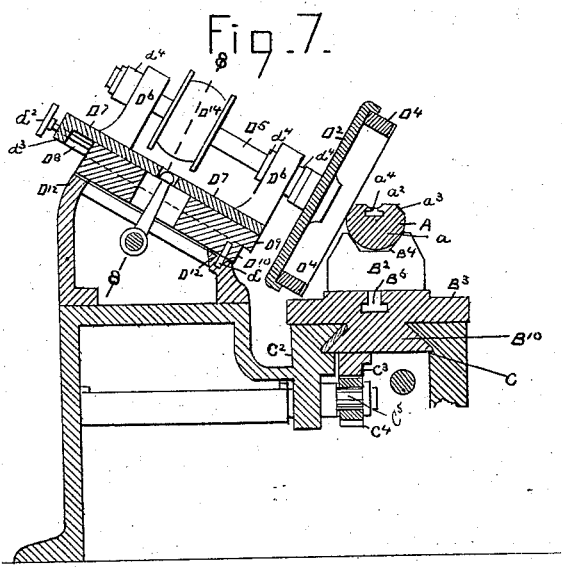
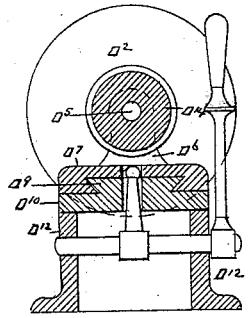
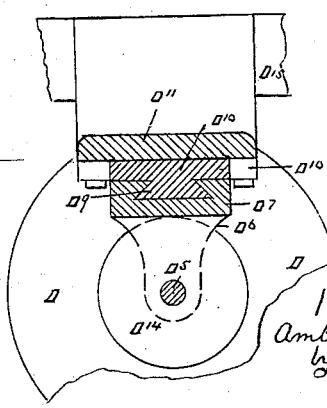
WITNESSES
INVENTOR.
Ambrose Webster
by his Attorneys
Brown Bros.

UNITED STATES PATENT OFFICE.

AMBROSE WEBSTER, OF WALTHAM, MASSACHUSETTS.

MACHINE FOR GRINDING LATHE-BEDS.

SPECIFICATION forming part of Letters Patent No. 417,615, dated December 17, 1889.

Application filed January 30, 1889. Serial No. 298,091. (No model.)

*To all whom it may concern:*

Be it known that I, AMBROSE WEBSTER, a citizen of the United States of America, and a resident of the city of Waltham, in the county of Middlesex and State of Massachusetts, have invented certain new and useful Improvements in Machines for Grinding Lathe-Beds, of which the following is a full, clear, and exact description.

This invention relates to the beds of watchmakers' lathes, and to a machine for grinding their running or working faces.

The machine of this invention, in substance, is composed of a horizontal carrier for the lathe-bed to be ground, which is arranged and adapted otherwise to travel horizontally on and along a suitable stationary support and guideway, appliances to secure the lathe-bed on said carrier and to have its top and opposite side oblique faces exposed, appliances to move said carrier along its said support and guideway, and a circular grinding lap or laps for grinding the lathe-bed, and which are arranged and adapted otherwise to be continuously rotated, and under rotation to be presented to the said exposed surfaces of the lathe-bed to be ground by them, and which lathe-bed is fed forward to them by the movement of its carrier, as aforesaid, and all otherwise substantially as hereinafter described, and pointed out in the claims.

In the drawings forming part of this specification a machine of this invention for grinding lathe-beds is illustrated.

This machine fully organized has three separate circular grinding-laps, one to grind the upper surface of the lathe-bed, and one on each of the opposite sides of the lathe-bed to grind its side surfaces and severally arranged and adapted for independent rotation and presentation to the lathe-bed.

Figure 1 is a plan view with the side grinding-laps removed and the upper grinding-lap partially broken out. Fig. 2 is a transverse vertical section of the support and guideway for the lathe-bed, also of the lathe-bed and an end elevation of the machine otherwise, and with one of the side grinding-laps broken out and in vertical section and the other removed. Figs. 3, 4, and 5 are views enlarged, respectively, a plan, a longitudinal vertical section, and in parts a side elevation and a transverse vertical section and end elevation of the lathe-bed carrier, and mechanism for fastening the lathe-bed at its opposite ends on it. Fig. 6 is a longitudinal vertical section, and in some parts a side elevation, of the machine as illustrated in Fig. 1. Fig. 7 is a transverse vertical section of one of the side grinding-laps of the support or guideway for the lathe-bed, of the lathe-bed, and of the support for the operating mechanism of the side grinding-lap. Fig. 8 is a vertical section, line 8 8, Fig. 7. Fig. 9 is a horizontal section, line 9 9, Fig. 6.

In the drawings, A is the lathe-bed to be ground.

B, $B^2$, and $B^3$ is the carrier for the lathe-bed A, made up of the end blocks B $B^2$ and a carriage $B^3$, to which the blocks are attached.

C is the horizontal stationary support or guideway for the lathe-bed carrier B $B^2$ $B^3$, and D, $D^2$, and $D^3$ are the circular grinding-laps.

The lathe-bed A, in cross-section, as particularly shown and well known, is half-round, as at $a$. Its upper side $a^2$ is flat, and also its opposite sides $a^3$ $a^3$, which meet the flat top $a^2$ at oblique angles.

The lathe-bed A has an inverted-T groove $a^4$, running lengthwise of its upper side. Each end block B $B^2$ of the lathe-bed carrier is recessed on its upper side, as at $B^4$, to receive and support the lathe-bed A, at opposite sides of its rounded part $a$. Again, each block B $B^2$ has a tongue $B^5$ to enter the inverted-T groove $B^6$ of the carriage $B^3$ of the carrier, and each also has a headed screw-bolt $B^7$ and screw-nut $B^8$, which, by the tongues $B^5$ of the blocks entered into the groove $B^6$ of carrier $B^3$, engage and rigidly fasten the blocks to carriage $B^3$, all particularly shown, Figs. 3, 4, and 5. The blocks B $B^2$ are at opposite ends of the lathe-bed, and, as shown, are joined by a bar $B^9$; but obviously they may, and preferably will, be separate. The carriage $B^3$ of the lathe-bed carrier on its under side has a dovetail projection $B^{10}$, which engages a corresponding horizontal dovetail groove or way C, the guideway for the lathe-bed carrier. The guideway C runs lengthwise of a stationary bed or platform $C^2$, which constitutes the main support for the stationary and working parts of the machine.

$C^3$ is a horizontal toothed or rack bar of and running lengthwise of the dovetail projection $B^{10}$ of the lathe-bed carrier B $B^2$ $B^3$, and $C^4$ is a vertical pinion gear-wheel meshing said rack-bar $C^3$. The pinion $C^4$ is carried by a horizontal arbor $C^5$, turning in suitable bearings of the support or platform $C^2$. Turning the pinion $C^4$ in either direction moves the lathe-bed carrier B $B^2$ $B^3$ in the corresponding direction along the dovetail guideway C, and, if the lathe-bed A is suitably attached to the carrier, obviously the lathe-bed will be similarly moved.

E $E^2$ are clamping-jaws at opposite ends of the lathe-bed and held on the blocks B $B^2$ of the lathe-bed carrier. Each jaw E $E^2$ is vertical, and at its lower end it is hung on the eccentric portion $e$ of a horizontal pin $e^3$, turning at opposite end portions in fixed ear-pieces $e^4$ of the blocks B $B^2$. The upper end of each jaw has a horizontal projection on arm $e^6$, shaped in cross-section to lie within and closely fit the vertical portion of the groove $a^4$ of the lathe-bed. The jaws E $E^2$, engaged with the groove of the lathe-bed, as described, hold the lathe-bed against sidewise movement or rocking on the blocks B $B^2$, and, drawn downward by the action thereon of the eccentric $e^2$ of their pins $e^3$, properly turned. They are also made to hold the lathe-bed otherwise to the blocks.

$e^7$ is a headed stop-pin screwed into block $B^2$, and in position for its head to act as a stop for one end of the lathe-bed in placing the lathe-bed on the blocks. This stop-pin is adjustable by screwing it in or out of the block $B^2$.

$E^3$ is a vertical stirrup-arm suspended upon the axial pin $e^3$ of the jaw $E^2$ and outside of the ear-pieces $e^4$. With the lathe-bed placed on its supports or blocks B $B^2$ the stirrup-arm $E^3$ is then swung over the end of the bed A, and the bed is thus made level in the blocks B $B^2$ on which the jaws E $E^2$ are engaged with the opposite ends of the bed and being also drawn down, all as described, the stirrup-arm $E^3$ is swung off and the jaws fixed against accidental movement by turning up the screw-nuts $e^8$ of their pins $e^3$, and with the blocks B $B^2$ engaged and fastened to the part $B^3$, and it engaged with the dovetail-way C, the lathe-bed is fully arranged for being moved on the then turning of the pinion $C^4$.

Each grinding-lap D $D^2$ $D^3$ consists of a flat wheel or disk with a concentric circular flange or rim $D^4$ at right angles to it. The flanges or rims $D^4$ are made of emery or other material suitable for grinding. Each lap is secured to one end of an arbor $D^5$, arranged in turn at opposite end portions in bearings of standards $D^6$ $D^6$, held on a plate $D^7$, and each plate $D^7$ has a dovetail groove or way $D^8$, which is parallel with the axial line of the arbor $D^5$ and engages a corresponding dovetail projection $D^9$ of a plate $D^{10}$, held on stationary supports $D^{11}$, $D^{12}$, and $D^{13}$, respectively, for the carrying parts, as described, of the laps D $D^2$ $D^3$.

The support $D^{11}$ for the lap D is vertical and is attached by opposite side arms $D^{15}$ to the main bed or support $C^2$, all so that the lathe-bed and its carrier can pass freely under it, Fig. 6. The lap D is horizontal and is for grinding by the edge of its emery rim $D^4$ the upper surface of the lathe-bed. The lap D, Fig. 6, in grinding position, preferably, is slightly inclined in the direction of the length of the lathe-bed, so as to present only one and the portion of its grinding-edge to the lathe-bed to which the lathe-bed is first presented as it is fed forward to be ground, in the direction shown by arrows, Figs. 1 and 6. This inclination of the lap D, Fig. 6, is secured by having the face of the support $D^{11}$, to which the lap is secured, as has been described, at its upper end slightly advanced. Each support $D^{12}$ and $D^{13}$ for the laps $D^2$ $D^3$ is a stationary table or platform on opposite sides of the lathe-bed A, and shown as in line with each other and each inclining toward the longitudinal vertical central plane of the lathe-bed. Each lap $D^2$ $D^3$ is at a corresponding angle of inclination to the lathe-bed and each in grinding position, Fig. 7, preferably has its grinding-edge at only one portion presented to the lathe-bed for working thereon. This portion of each lap $D^2$ $D^3$ is at the greater distance from the axial line of the lap D and is secured by inclining the lap from side to side in the direction of the length of the lathe-bed secured from swinging its support $D^{11}$ on the pin $d$ of the supporting-platforms $D^{12}$ $D^{13}$, suitably located therefor.

The dovetail way and projection $D^8$ and $D^9$, connections of lap-carrying plates $D^7$, with the stationary supports $D^{11}$ $D^{12}$ $D^{13}$, allow the laps to be moved toward and away from working on the lathe-bed, and each lap is held in position by an adjustable stop-pin $d^2$, screwing through the ear-piece $d^3$ of the plates $D^7$ and at rest against the outer ends of the dovetail projections $D^9$.

The arbor $D^5$ of each lap D $D^2$ $D^3$ is free to rotate in its bearings and is suitably confined—as, for illustration, by collars $d^4$ $d^4$—against lengthwise movement through the bearings $D^6$.

$D^{14}$ is a pulley-wheel on each arbor $D^5$, to be belted to separate driving-pulleys (not shown) suitably located therefor.

In the use of the machine described the lathe-bed to be ground being secured to the carrier B $B^2$ $B^3$, as explained, is then fed continuously along the guideway C and presented to a lap or laps D $D^2$ $D^3$, which at the same time are under continuous rotation, the whole resulting in the grinding of the surface or surfaces of the lathe-bed in relation to which a lap or laps have been arranged and adjusted to act. This operation is to be repeated until the several faces $a^2$ $a^3$ of the lathe-bed have been ground, and in a machine having the laps arranged as particularly shown and described the upper surface $a^2$ and one side surface $a^3$ of the lathe-bed can be ground simultaneously, to be followed by again feeding the lathe-bed forward and grinding its other side surface. Obviously, however, by arranging the side grinding-laps in suitable relation to each other and the top grinding-lap the three laps can be simultaneously in operation on the lathe-bed; but, however, this is not necessary. The feed of the lathe-bed forward to the laps may be secured by hand or by other power, and the machine may be adapted for both hand and other power feed of the lathe-bed.

Again, the machine of this invention plainly may be used for purposes other than grinding lathe-beds.

Having thus described my invention, what I claim, and desire to secure by Letters Patent, is—

1. In a machine for grinding lathe-beds, in combination, a carrier for the lathe-bed to be ground, and appliances held on and for securing it to the carrier, consisting of jaws E E$^2$ at its opposite ends, each adapted to be engaged with and disengaged from and to draw it down onto the carrier, substantially as described, for the purpose specified.

2. In a machine for grinding lathe-beds, a carrier for the lathe-bed to be ground, composed of end blocks B B$^2$ at its opposite end portions and each having a recess B$^4$ to seat it, and a tongue projection B$^5$, and a carrier B$^3$, having a guideway B$^6$ to receive said tongue projections B$^5$, headed screw-bolts and nuts for attaching said blocks B$^2$ B$^3$ to and engaging them with the guideway of carrier B$^3$, and a dovetail projection B$^{10}$, in combination with a stationary guideway C, engaged by said carriage-dovetail B$^{10}$, substantially as described, for the purpose specified.

3. In a machine for grinding lathe-beds, in combination, a carrier for the lathe-bed to be ground, and appliances held on and for securing it to the carrier, consisting of a swinging stirrup-arm E$^3$ at one of its ends for leveling it on the carrier, and jaws E E$^2$ at its opposite ends, each adapted to be engaged with and disengaged from and to draw it down onto its carrier, substantially as described, for the purpose specified.

In testimony whereof I have hereunto set my hand in the presence of two subscribing witnesses.

AMBROSE WEBSTER.

Witnesses:
ALBERT W. BROWN,
GEO. C. BENT.